(12) United States Patent
Hughes

(10) Patent No.: US 8,219,709 B2
(45) Date of Patent: Jul. 10, 2012

(54) METHOD FOR INTERNET NAME SHARING

(76) Inventor: Carolyn J Hughes, Victoria (CA)

( * ) Notice: Subject to any disclaimer, the term of this patent is extended or adjusted under 35 U.S.C. 154(b) by 1499 days.

(21) Appl. No.: 10/190,155

(22) Filed: Jul. 5, 2002

(65) Prior Publication Data

US 2004/0006597 A1     Jan. 8, 2004

(51) Int. Cl.
*G06F 15/16* (2006.01)
(52) U.S. Cl. ........ 709/245; 709/223; 709/226; 709/227; 709/229; 709/238
(58) Field of Classification Search .......... 709/217–219, 709/201–203, 245, 238, 229, 226
See application file for complete search history.

(56) References Cited

U.S. PATENT DOCUMENTS

| | | | | |
|---|---|---|---|---|
| 5,619,648 A * | 4/1997 | Canale et al. | ................. | 709/206 |
| 6,249,807 B1 * | 6/2001 | Shaw et al. | ................... | 709/206 |
| 6,393,423 B1 * | 5/2002 | Goedken | ........................ | 707/10 |
| 6,412,014 B1 * | 6/2002 | Ryan | ............................ | 709/245 |
| 6,593,943 B1 * | 7/2003 | MacPhail | ...................... | 715/734 |
| 6,678,717 B1 * | 1/2004 | Schneider | ..................... | 709/203 |
| 6,735,585 B1 * | 5/2004 | Black et al. | ........................ | 707/3 |
| 6,745,248 B1 * | 6/2004 | Gardos et al. | ................ | 709/245 |
| 6,880,007 B1 * | 4/2005 | Gardos et al. | ................ | 709/225 |
| 6,901,436 B1 * | 5/2005 | Schneider | ..................... | 709/219 |
| 6,912,532 B2 * | 6/2005 | Andersen | ....................... | 707/10 |
| 6,917,972 B1 * | 7/2005 | Basko et al. | ................. | 709/224 |
| 6,918,066 B2 * | 7/2005 | Dutta et al. | ..................... | 714/46 |
| 6,922,815 B2 * | 7/2005 | Rosen | ........................... | 715/782 |
| 2001/0037253 A1 * | 11/2001 | Kensey | ........................... | 705/26 |
| 2002/0010795 A1 * | 1/2002 | Brown | ......................... | 709/245 |
| 2003/0145113 A1 * | 7/2003 | Pickel et al. | ................. | 709/245 |

OTHER PUBLICATIONS

Online Shopping Mall, shopsofweb (2001), URL: http://web.archive.org/web/20020528081333/http://shopsofweb.com/.*
Yahoo.(2001) http://web.archive.org/web/20010703093828/http://www.yahoo.com/.*
Google, Google-Images (2001) (http://www.google.com/imghp).*
Amazon.com (2001) Online Shoppes (www.amazon.com).*
Go, Go.com Attachment, (2001) URL: http://web/archive.org/web/20010703031957/http://www.go.com, pp. 1-6.*
Waxer, Cindy, First.com, First Served? Business 2.0, p. 48 (3) March 200 URL:http:/www.business2.com.*
PR Newswire, GO.com Debuts as Fourth Most Popular Domain on the Internet, New York: Feb. 22, 1999., URL: http://proquest.umi.com/pqdweb?did=39163509&sid=9&Fmt=3&clientId=19649&RQT=309&VName=PQD.*
M2 Presswire, ISOCOR: ISOCOR releases N-PLEX Global v4.0 for Solaris Internet, Coventry: Apr. 8, 1999., URL: http://proquest.umi.com/pqdweb?did=40375672&sid=10&Fmt=3&clientId=19649&RQT=309&VName=PQD.*
Business Wire, ISOCOR and Silicon Graphics Announce New Internet Messaging Solution to ISPs and Corporations; Industry Leaders Align to Handle Tremendous Growth in Electronic Messaging Business & Technology Editors. Business Wire. New York: Feb. 24, 1999.*
Waxer, Cindy, First.com, First Served? Business 2.0, p. 48 (3) Mar. 2000 URL:http:/www.business2.com.*

\* cited by examiner

*Primary Examiner* — Dohm Chankong

(57) ABSTRACT

The present invention allows similar named entities having trademarks or tradenames or other monikers in common, to market their complete electronic media identity, including web site and generic electronic mail boxes, using the same domain name which is shared without requiring sub-delegation. It satisfies both the uniqueness requirements of the current addressing system and sovereign trademark laws which have long been at odds.

33 Claims, 19 Drawing Sheets

FIG. 1.1
① User queries Whois for availability of domain name MOSQUITOBREATH.COM
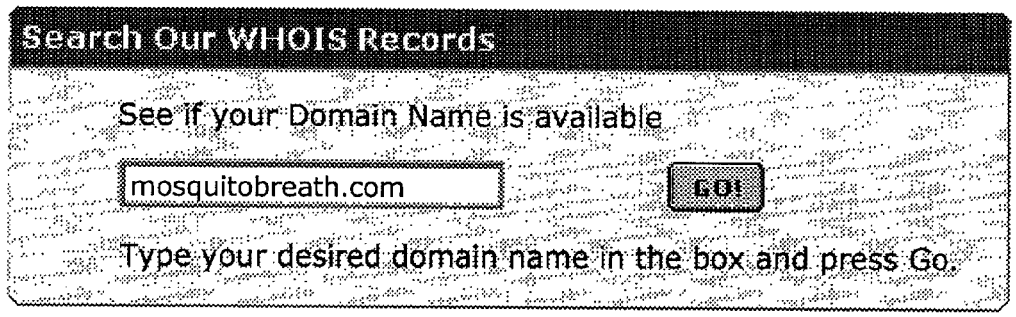
② Whois query result returned indicates MOSQUITOBREATH.COM can be registered

FIG. 1.2

① User queries Whois for availability of domain name EXAMPLEBIZ.COM

Search Our WHOIS Records

See if your Domain Name is available

[examplebiz.com]   GO

Type your desired domain name in the box and press Go.

② Registrant Record is returned.

Therefore, domain name is not available.

WHOIS Search Results

Domain name: EXAMPLEBIZ.COM

Registrant Contact:
  John Doe  (johndoe@examplebiz.com)
  789 Happyface Place
  Somewear, WA 98105
  USA Administrative Contact:
  John Doe  (johndoe@examplebiz.com)
  789 Happyface Place
  Somewear, WA 98105
  USA Technical Contact:
  Jane Doe  (jane@examplebiz.com)
  789 Happyface Place
  Somewear, WA 98105
  USA Name servers:
  DNS1.HOSTEDSOMEWHERE.COM
  DNS2.HOSTEDSOMEWHERE.COM Created: 07/19/97 00:00:00
Expires: 07/18/02 00:00:00

Fig. 1.3

(1) User queries Whois for availability of domain name EXAMPLEBIZ.COM

Search Our WHOIS Records

See if your Domain Name is available

[examplebiz.com]   [GO]

Type your desired domain name in the box and press Go.

(2) Registrant Record returned indicates it is a shared domain.

Record contains link to register.

WHOIS Search Results

Domain name: EXAMPLEBIZ.COM

Registrant Info:
➤ THIS IS A SHARED DOMAIN NAME
➤ Register Here (share@examplebiz.com)
To Share This Name
123 Anyplace Circle
Successville, WA 98125
USA Administrative Contact:
EXAMPLEBIZ SHARED DOMAIN NAME
John Doe (domainadmin@examplebiz.com)
123 Anyplace Circle
Successville, WA 98125
USA Technical Contact:
EXAMPLEBIZ SHARED DOMAIN NAME
Jane Doe (techadmin@examplebiz.com)
123 Anyplace Circle
Successville, WA 98125
USA Name servers:
  DNS1.HOSTEDSOMEWHERE.COM
  DNS2.HOSTEDSOMEWHERE.COM Creation date: 02/21/2005 04:29:57
Expiration date: 02/21/2006 04:29:57

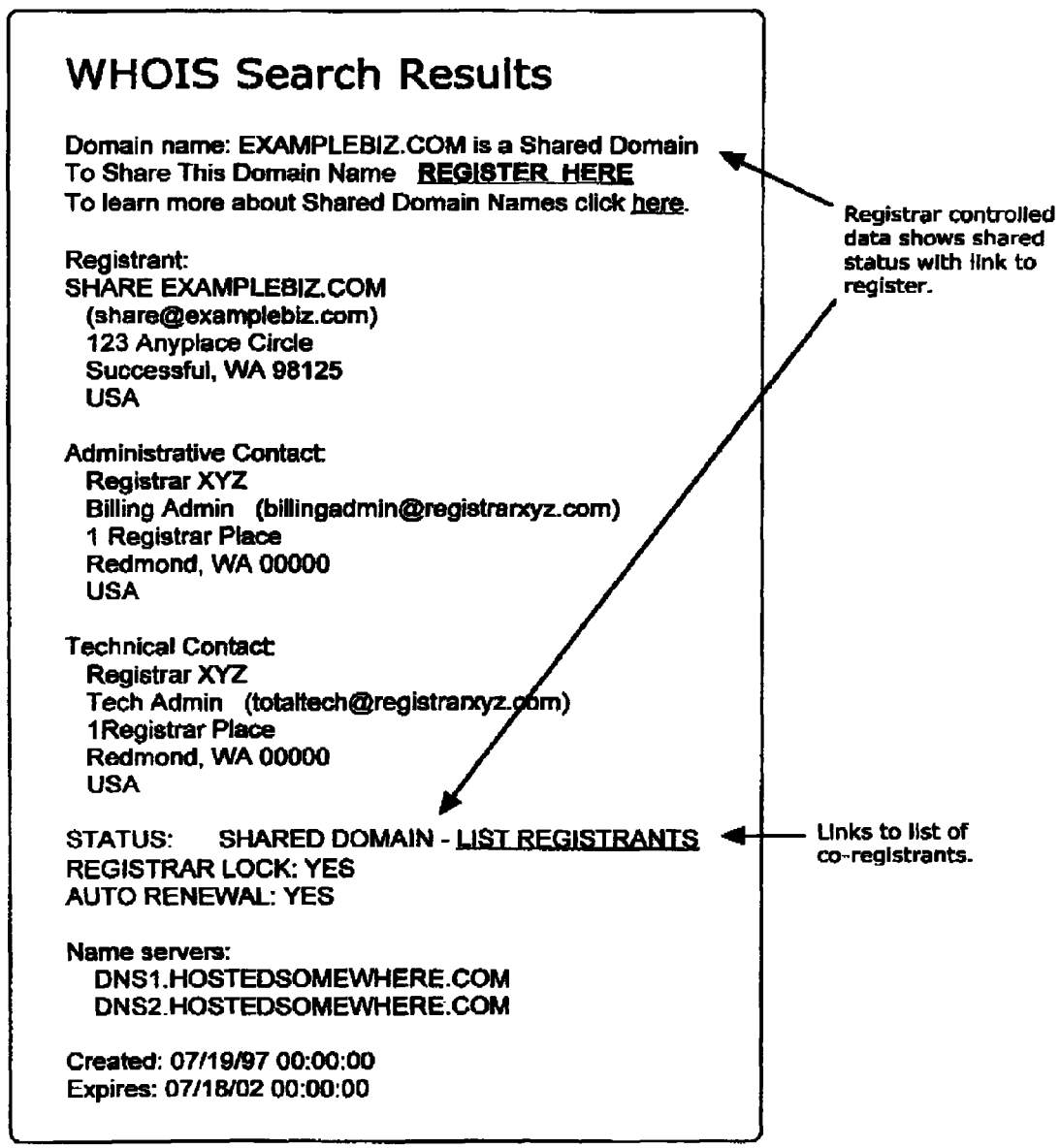
Fig. 1.4

Fig. 1.5

(1) User queries Whois for EXAMPLEBIZ.SHARE (2) User receives Whois results for EXAMPLEBIZ.SHARE

▶ WHOIS Search Results

Your selection is available for Shared Registration

What Is Shared Registration?

If you would like to share use of Domain EXAMPLEBIZ.SHARE click Register Now below

[Register Now]

Click here to view a list of current registrants sharing domain EXAMPLEBIZ.SHARE (3) User clicks on "list of current registrants" in 2 above (4) User can clicks on any registrant shown to see their individual registrant record

▶ WHOIS Search Results

List Registrants: EXAMPLEBIZ.SHARE          [Register Now]

Click on a name to view record

ExampleBiz Travel

ExampleBiz Software

ExampleBiz Kids Wear

ExampleBiz Press

ExampleBiz Natural Foods

ExampleBiz Mountain Riders

FIG. 3
Visitor wants to go to ExampleBiz Realty's site and points browser to www.examplebiz.com
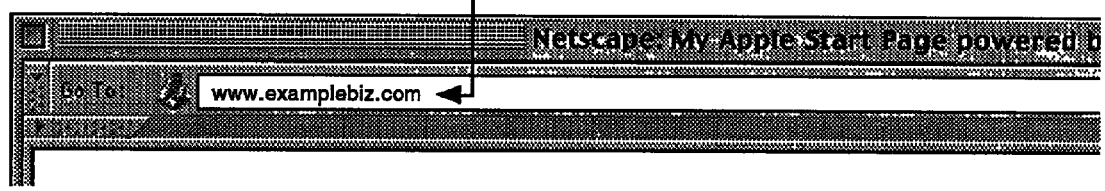
Visitor arrives at ExampleBiz.com Shared Gateway Site
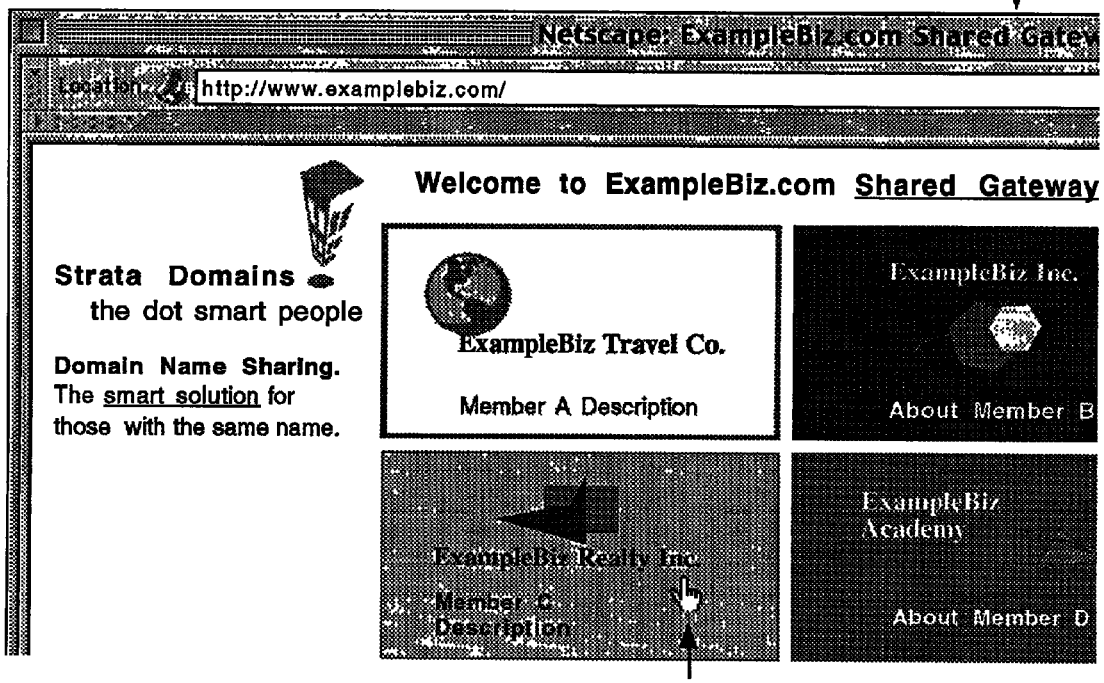
Visitor selects ExampleBiz Realty and goes to their site.
On ExampleBiz Realty's home page the Browser Location Bar continues to show the Gateway URL.
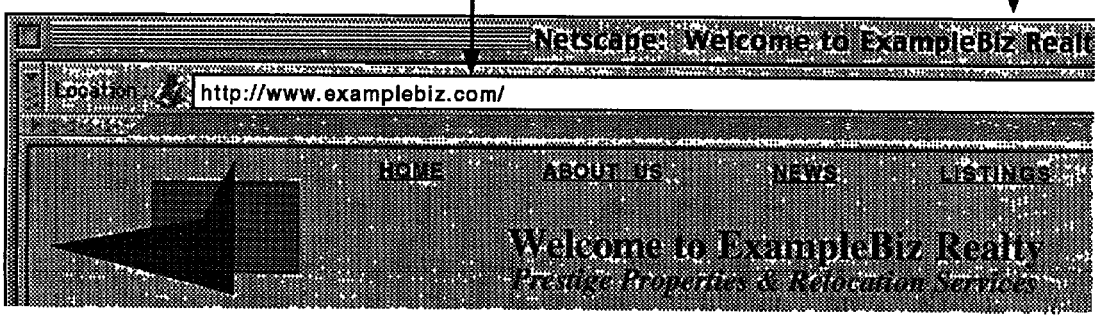

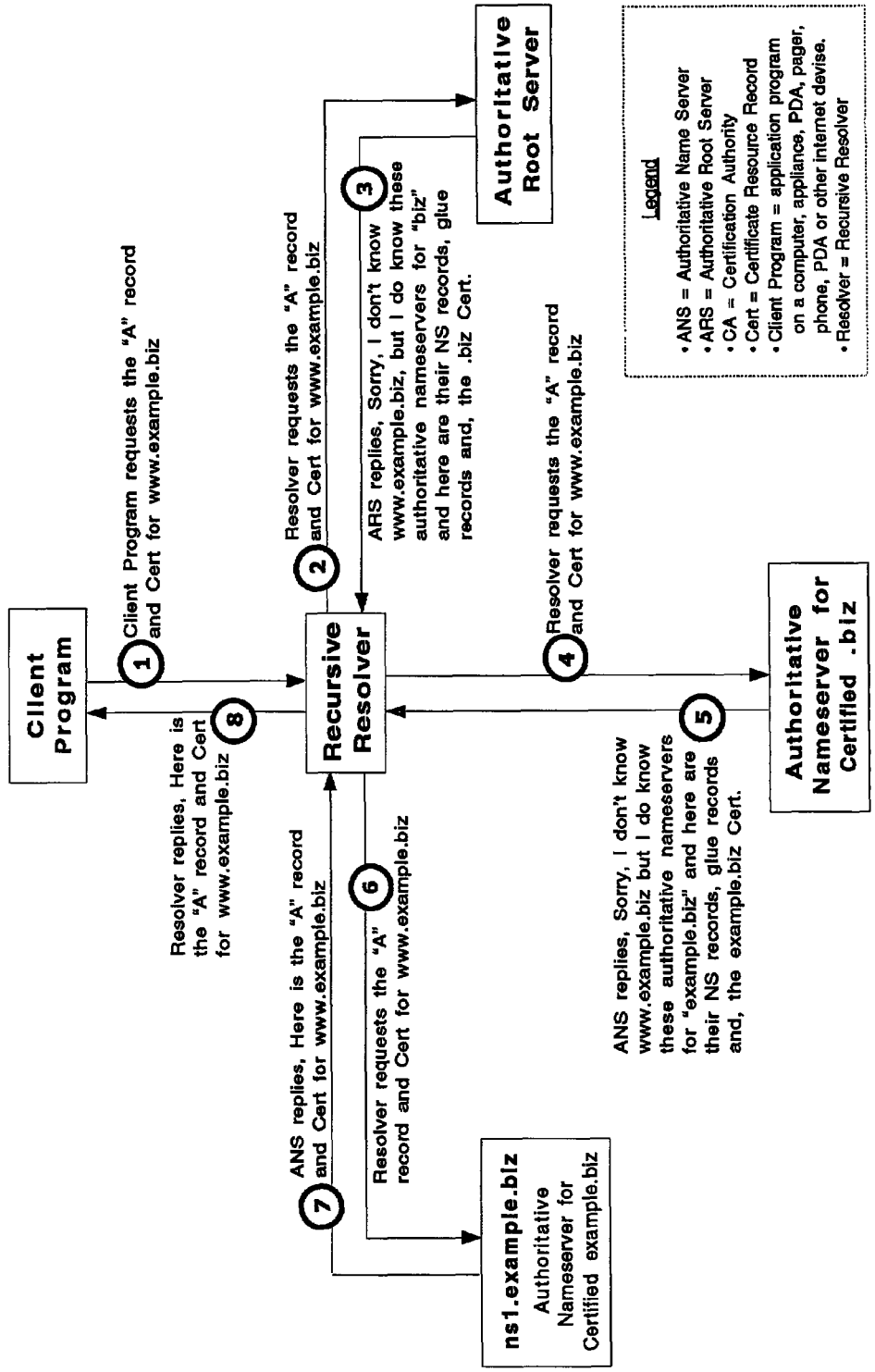
FIG. 10.1

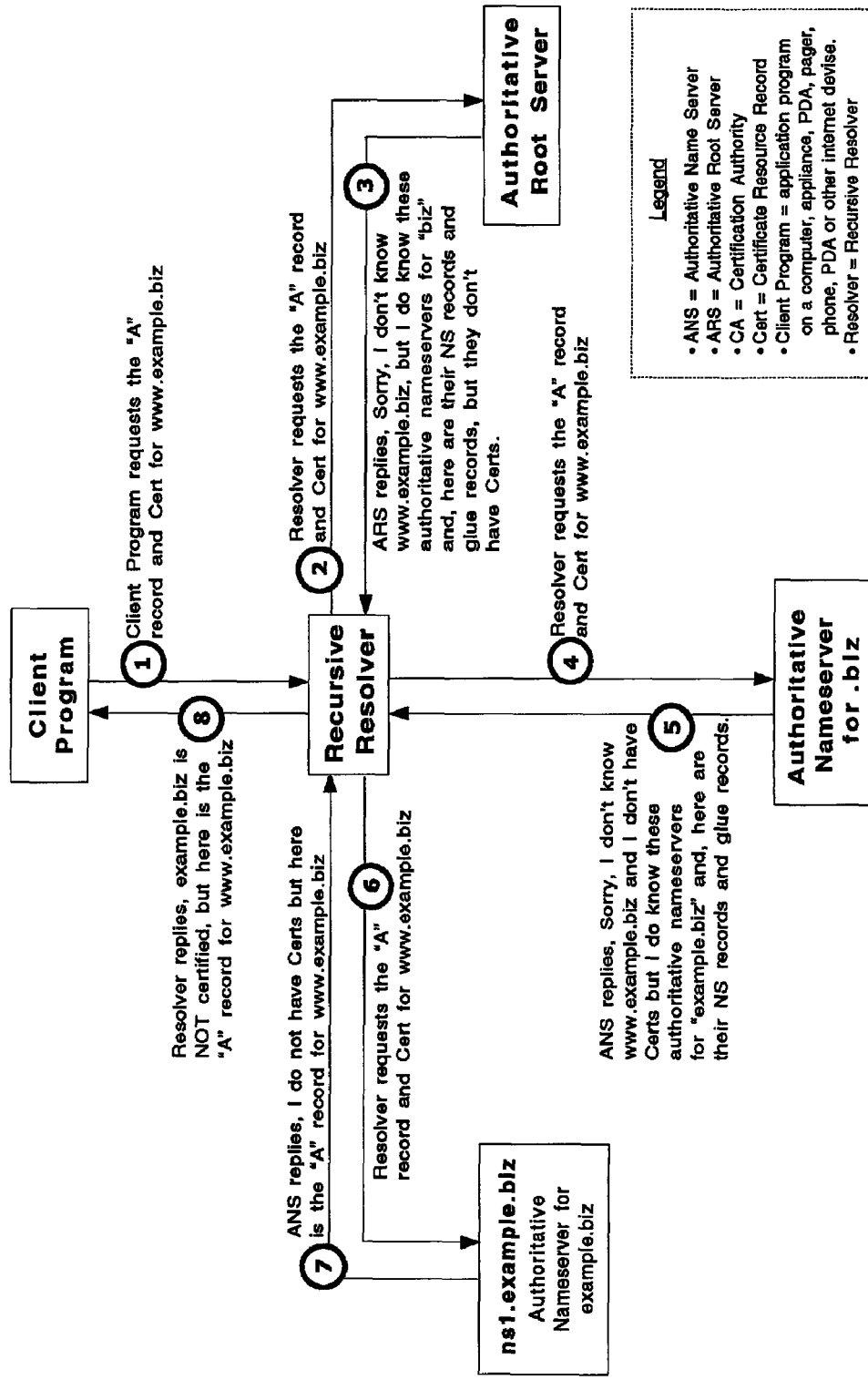
FIG. 10.2
Resolving a DNS query for www.example.biz when: the user's browser preferences are set to request certification; and the top level domain .biz is NOT certified; and, the domain name example.biz is NOT certified.

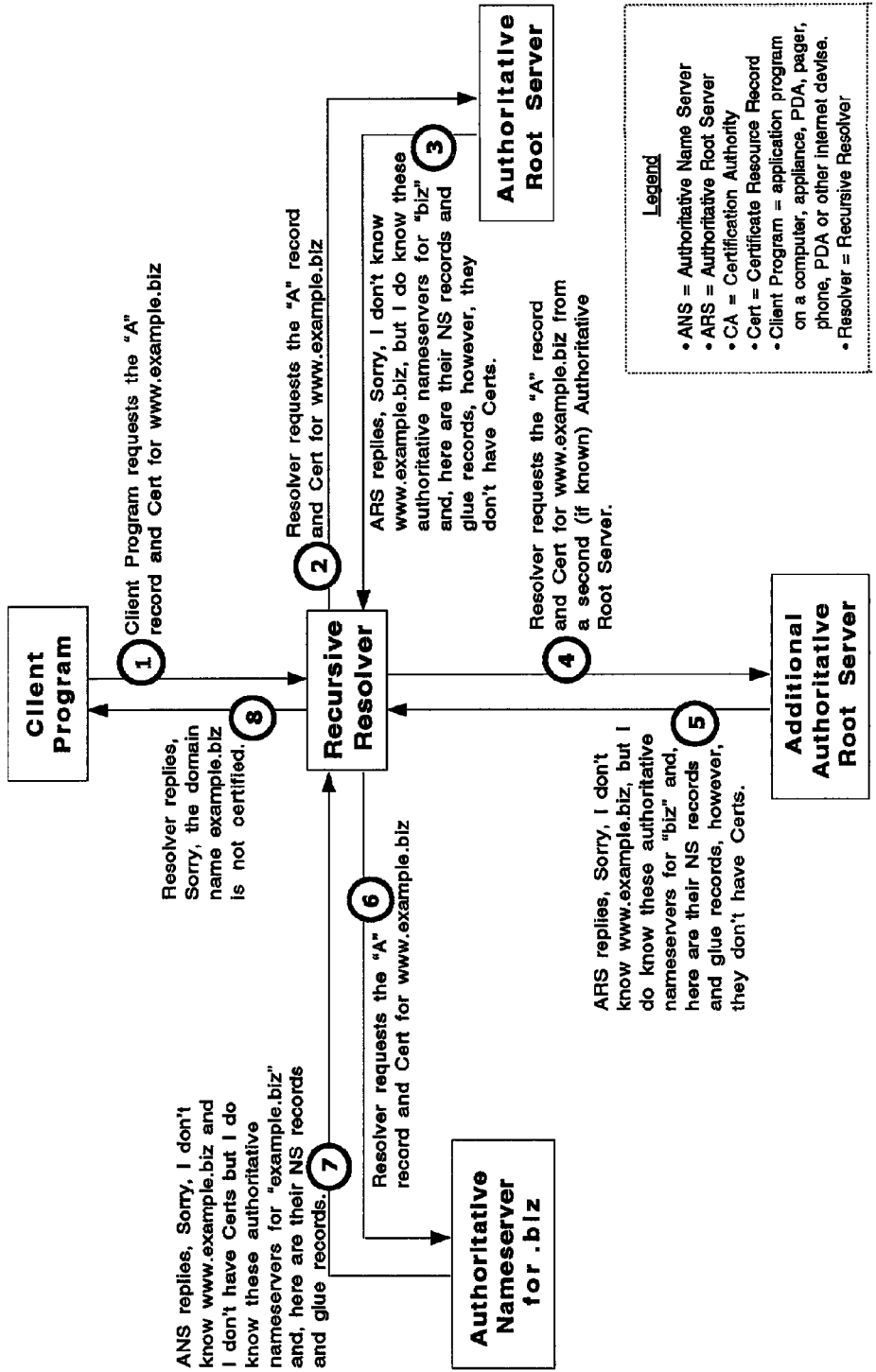
FIG. 10.3 Resolving a DNS query for www.example.biz when: user's browser preferences or user's ISP requires certification; and the top level domain .biz is NOT certified; and, the domain name example.biz is NOT certified.

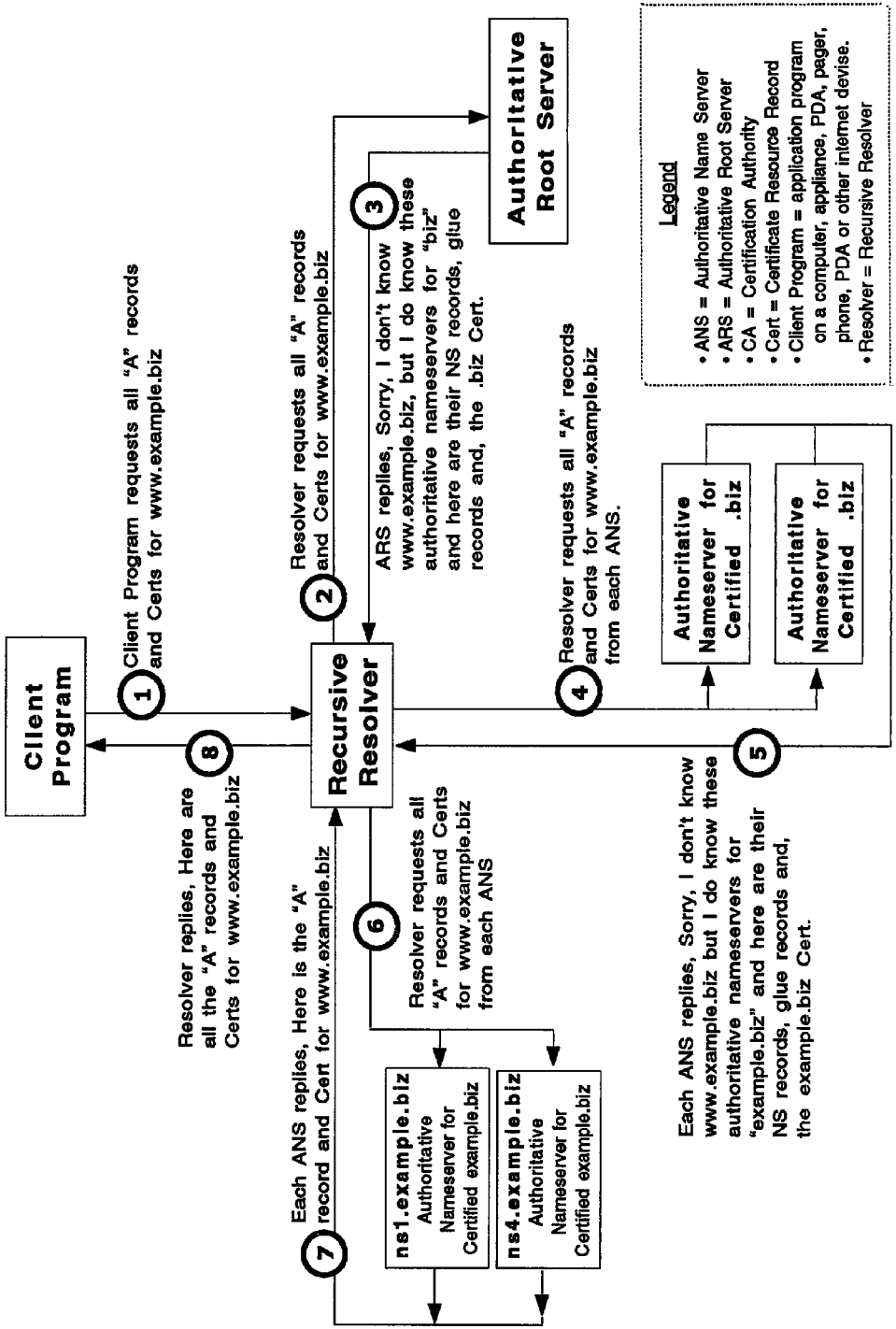
FIG. 10.4
Resolving a DNS query for www.example.biz when: user's browser preferences are set to request certification and accept multiple records; and the top level domain .biz is certified; and, the domain name example.biz is certified as a shared domain.

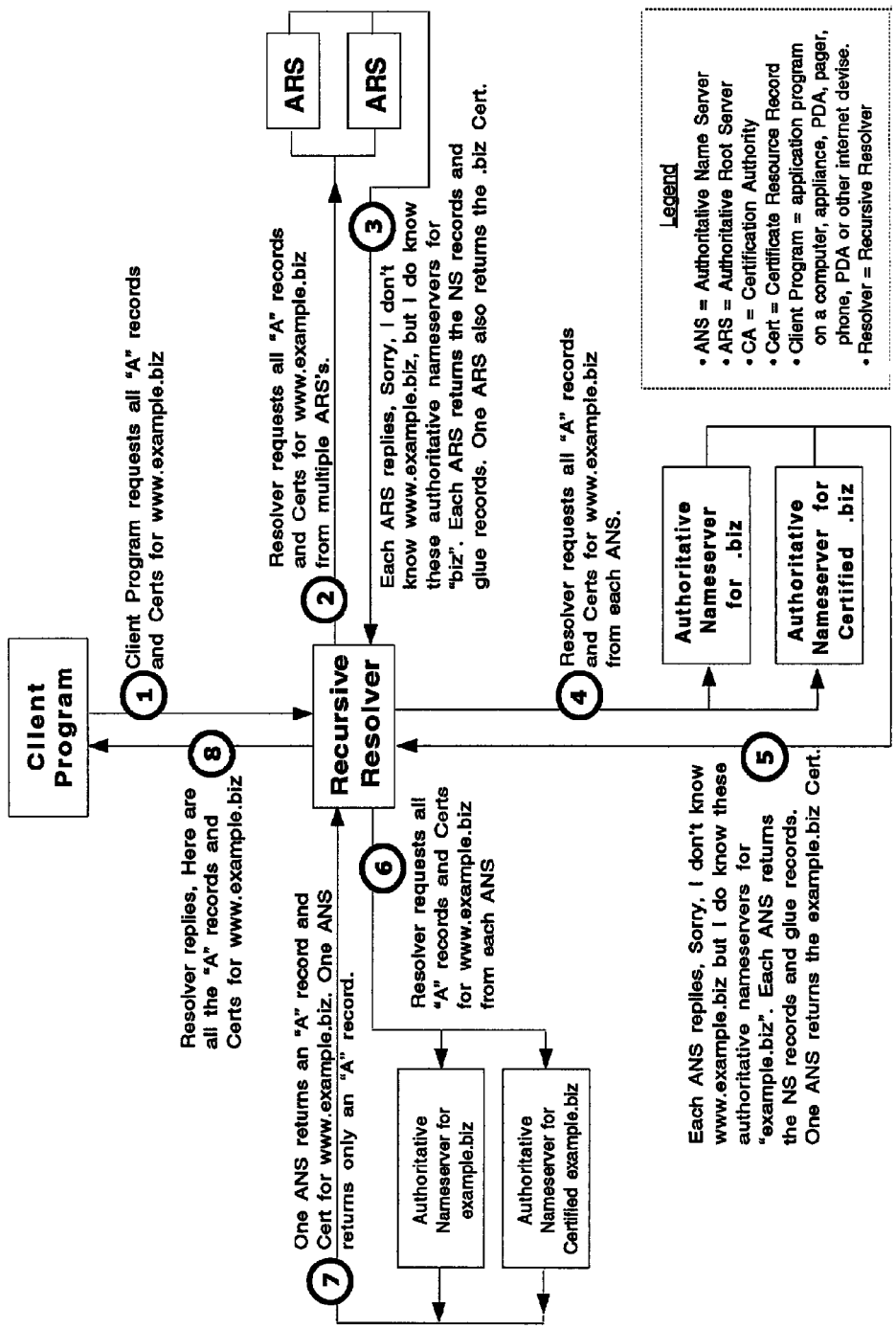
FIG. 10.5
Resolving a DNS query for www.example.biz when: user's browser preferences are set to request certification and accept multiple records; recursive resolver queries multiple roots; the top level domain .biz is certified; and, the domain name example.biz is certified as a shared domain.

METHOD FOR INTERNET NAME SHARING

This patent application was first disclosed in Document Disclosure dated Jul. 7, 2000, Disclosure 476593.

BACKGROUND OF THE INVENTION

The present invention relates to domain name sharing on both the World Wide Web and electronic mail. In particular, the present invention is applicable to domain sharing at the top level domain address without reduced designation and provides for e-mail autonomy including concurrently using generic e-mail addresses.

Most people believe that an accurate association of an entity's name with their web site and e-mail addresses is necessary. The less intuitive this association is the more error prone it is. No company wants its customers to be visiting the web sites of others having a similar name instead of reaching its site. This is particularly problematic for a company when another party has the domain name (and accompanying web site) that is most likely to be guessed by its customers.

The domain name system as it has evolved has made domain names into global identifiers. Domain name policy, as it has been crafted and applied, has created the notion that domain names reflect trademarks and, that only one trademark can be recognized per domain name. This notion, together with widespread marketing of multiple domain name registrations as a trademark protection strategy, has resulted in fierce competition for a limited resource.

It has also created many ethical and legal dilemmas in the marketplace. On the one hand, American and other sovereign Trademark laws accommodate multiple entities having the same registered mark without threat of dilution. On the other hand, domain names offer only one identical name per extension and have been marketed since the beginning on a first-come-first-served basis. This has necessarily created fear of loss for trademark owners. Further, because domain names have been embraced as global identifiers, consumer confusion over a trademark holder's domain name is just as threatening as dilution under trademark law.

Some others have tried to solve this problem by introducing legislation or domain name policy, but this has not solved the problem. There are still millions of cases where more than one party—indeed, often many parties—have rights to the same moniker and would like to have use of the corresponding domain name.

Another attempt to solve this problem has been to introduce new domain names into the marketplace by way of adding new top level domain extensions. It was hoped that someone who could not get a certain domain name in the .com extension would have a chance to acquire it in the new extension. However, this has provided little or no solution since the holders of trademarks have had first dibs in the registration process, scooping up all similar sounding domain names prior to the names being available on the open market. Moreover, the length of time it took to bring any new extensions to the marketplace has meant that the .com extension necessarily enjoys a de facto brand name status and remains the most desired. Clearly, there exists a need for a solution.

There is a need to reframe the way in which domain names are regarded as unique identifiers.

For the domain name consumer, the desire to be first to register a domain name, or to otherwise acquire it, is typically not with the motive to prevent others having the same moniker, but rather, to ensure that they are not shut out themselves. Accordingly, there is a need for domain naming solutions that are inclusive in nature rather than exclusive or punitive.

There is a need for a domain naming solution which can be broadly successful in the marketplace. That is, it must: recognize the customers' desire to have an intuitive domain name address; acknowledge and respect the rights of both common law and registered trademark holders; incorporate the wisdom and scope of sovereign trademark laws which allow for multiple registrants of the same mark; be use-intuitive and technically sound; and, work across multiple roots. Attempted solutions to date have failed to accomplish this.

Prior to the widespread use of computers and the commercialization of the internet for e-commerce, the idea of domain sharing would have been ridiculous. Locally, regionally, nationally and, certainly internationally, unaffiliated businesses or other entities who happen to use the same moniker or who own the same registered mark have no history of sharing a common access point to their goods or services merely because they have a name in common. While telephone directories (which are usually local), because of the alpha numerical layout, may list them sequentially, these entities share no common phone numbers or addresses merely because they have the same name. There is no marketplace history of those with the same marks or monikers locating together physically, or in a computer networked environment, for ease of consumer access, nor of advertising together for co-branding of the name.

Indeed, today the idea of two or more entities sharing a domain name for their comprehensive Internet presence identifiers is still novel. Yet, there is global recognition that the existing system does not fully satisfy the internet identification and location needs of internet users.

Therefore, there is a need for a domain name sharing solution that preserves unique identification, while embracing multi-party domain name use, such that both the requirements of the DNS addressing system and the scope of trademark and tradename use are compatible. There is a need for domain name sharing that functions for both the world wide web and e-mail, not just for one or the other. Further, there is a need for sharing at the top level domain address without reduced designation and, e-mail autonomy including the co-use of generic mail addresses.

SUMMARY OF THE INVENTION

These and other embodiments of the present invention are further made apparent, in the remainder of the present document, to those of ordinary skill in the art.

Embodiments of the present invention are directed to a method for allowing an internet user to access an internet location of a specific company having a similar name to other entities which have their own web sites and electronic mail addresses, as well as to allowing different entities that have a similar name the ability to co-locate at a top level domain address. The top level domain address is also designated as a second level domain name under a top level domain.

In one embodiment of the present invention, the method comprises: requesting access to a top level domain address of a similar name; accessing one or more address locations as a result from only requesting no more than one top level domain address;

In another embodiment of the present invention, the method further comprises sending an e-mail message intended for a specific company to a generic recipient mail address of the similar name, wherein one or more contained keywords are identified and used to route the e-mail message to a specific company with ease.

In a further embodiment of the present invention, the keyword is located in a subject field of the e-mail message or located in a body field of the e-mail message.

It is a further embodiment of the present invention, the web site of the specific company is accessed without having to request more than one top level domain address with the similar name.

In yet a further embodiment of the present invention, at least one page location of the web site of the specific company is accessed and the page location is hosted by a web server designated by the specific company.

In a further embodiment of the present invention, a single gateway web site at the top level domain address of similar name is accessed, an identifying link of the specific company having the similar name is viewed, and the specific company is selected by clicking on the identifying link. Additionally, another embodiment further comprises accessing a page location of the web site of the specific company wherein the page location contains at least one familiar uniform resource locator with the top level domain address of the similar name. The page location can be organized in a hierarchical organization as well.

In yet another embodiment of the present invention, in accessing the top level domain address of the similar name, multiple browser windows are opened wherein each browser window shows a different and live web site of similar name such that the user can select the web site of the specific company with ease. Additionally, another embodiment further comprises setting browser preferences for management of the browser windows. Furthermore, another embodiment further involves setting DNS query preferences for management of access requests for top level domain addresses. In addition, another embodiment comprises setting authoritative server query preferences.

In a further embodiment of the present invention, the method comprises entering into an agreement with one or more entities having a similar name to share a domain name for complete web presence identity and entering into an agreement to share generic recipient e-mail addresses at a domain name of the similar name. Additionally, an embodiment comprises further receiving an e-mail message with a keyword addressed to a generic recipient mail address at a top level domain address of the similar name. The keyword can be located in a subject field or a body field of the e-mail message.

In yet another embodiment, only one of the entities sharing the top level domain address of the similar name is a registrant of record for a second level domain name. Identifying links identifying a specific company on a gateway web site of the top level domain address having the similar name is presented and the identifying links are linked to a web site of the specific company. A status identifier indicating that the domain is a shared domain name can be recorded on a registrant record comprising a single registrant. The registrant record can be stored and modified. The registrant record can be retrieved by a client machine thus allowing a user or would-be registrant to ascertain the shared status and the effective period of registration.

In still another embodiment of the present invention, entities sharing the top level domain address of the similar name are co-registrants of a second level domain name. A new DNS resource record type for shared domain name registrations can be created for use within the name system. A new allowance for the new record type can be added to the system. In a further embodiment, the shared status can be recorded on a plurality of pre-existing record types. In a further embodiment, multiple copies of records having the shared name status can exist in the name system. A record showing a status of shared can be stored in a memory in a device connected to a network within the name system. A record of a shared domain name can be copied from one storage medium or storage location to another within the system and can belong to a collection of records which can be associated and queried for by type or by contents. A record of a shared name can be accessed and modified by a user in the system. A record of a shared name is retrievable by a client machine. Further embodiments provide for obtaining shared registration of a single second level domain name through a registrar, wherein shared domain name resource record and Whois records are generated for each registration of the single domain name and stored for query access within the name system. They can be modified by users and retrieved using a client. A registrant contact information and expiry date can be different for each registration of the same name having a shared status and can have overlap of the effective registration period. Still further embodiments provide for displaying multiple browser windows for access to a single top level domain address of the similar name; and certifying a shared second level domain name using certificates of authority.

Other embodiments of the present invention also comprise certifying a top level domain as a Certificate Authority by a trusted root certificate authority; certifying a second level domain name; further certifying a second level domain name as a shared domain name; generating sets of retrievable DNS records for top level and second level domain names, wherein the records identify the domain as shared; hosting records on authoritative nameservers whereby the source of certification and level of verification of top level domain address requests are easily identified; such that entities may share certifiable registration of a domain name and users are assured that web sites they access by requesting a top level domain address are legitimate.

Therefore, embodiments of the present invention satisfy the need for a trusted unique identifier, wherein a shared domain can function for both the world wide web and e-mail. Additionally, embodiments of the present invention satisfy the need for true domain name sharing which is more than just a combined presence on a web site without corresponding e-mail boxes or shared e-mail addresses without access to web identity at the similar name. Furthermore, these embodiments of the present invention satisfy the need for sharing at the top level domain address without reduced designation and, e-mail autonomy including the co-use of generic mail addresses.

Other objects, features and advantages of the present invention will become apparent upon reading the following specification, when taken in conjunction with the drawings and the claims.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 1.1 is an illustration of a typical web interface of the prior art for checking to see if a domain name is available for registration and a typical search result when the domain name is available.

FIG. 1.2 is an illustration of a typical web interface of the prior art for checking to see if a domain name is available for registration and a typical registrant record returned when the domain name is not available.

FIG. 1.3 is an illustration of a typical web interface for checking to see if a domain name is available for registration and a registrant record returned showing the effective registration period and shared registration status as defined by the registrant according to an embodiment of the present invention.

FIG. 1.4 is an illustration of a typical Whois query domain registrant record having shared domain status defined by the registrar according to an embodiment of the present invention.

FIG. 1.5 is an illustration of a typical Whois query result interface when a domain name in an alternate TLD is shared and new registrants are welcome, and the further step option of accessing the current registrants' records according to an embodiment of the present invention.

FIG. 3 is a schematic view of a typical graphical user interface path when the Shared Domain Name follows on to the Member's web site according to an embodiment of the present invention.

FIGS. 10.1-10.5 are flow charts illustrating how a DNS query for a top level domain address is typically resolved according to specific embodiments of the present invention.

FIG. 10.1 is a flow chart illustrating how a DNS query for a top level domain address is typically resolved when the user's browser preferences are set to request or require certification; and the top level domain.biz is certified; and, the domain name example.biz is certified;

FIG. 10.2 is a flow chart illustrating how a DNS query for a top level domain address is typically resolved when the user's browser preferences are set to request certification; and the top level domain.biz is NOT certified; and, the domain name example.biz is NOT certified;

FIG. 10.3 is a flow chart illustrating how a DNS query for a top level domain address is typically resolved when the user's browser preferences or user's ISP requires certification; and the top level domain.biz is NOT certified; and, the domain name example.biz is NOT certified;

FIG. 10.4 is a flow chart illustrating how a DNS query for a top level domain address is typically resolved when the user's browser preferences are set to request certification and accept multiple records; and the top level domain.biz is certified; and, the domain name example.biz is certified as a shared domain;

FIG. 10.5 is a flow chart illustrating how a DNS query for a top level domain address is typically resolved when the user's browser preferences are set to request certification and accept multiple records; recursive resolver queries multiple roots; the top level domain.biz is certified; and, the domain name example.biz is certified as a shared domain; according to embodiments of the present invention.

DETAILED DESCRIPTION OF THE SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Figure 1:
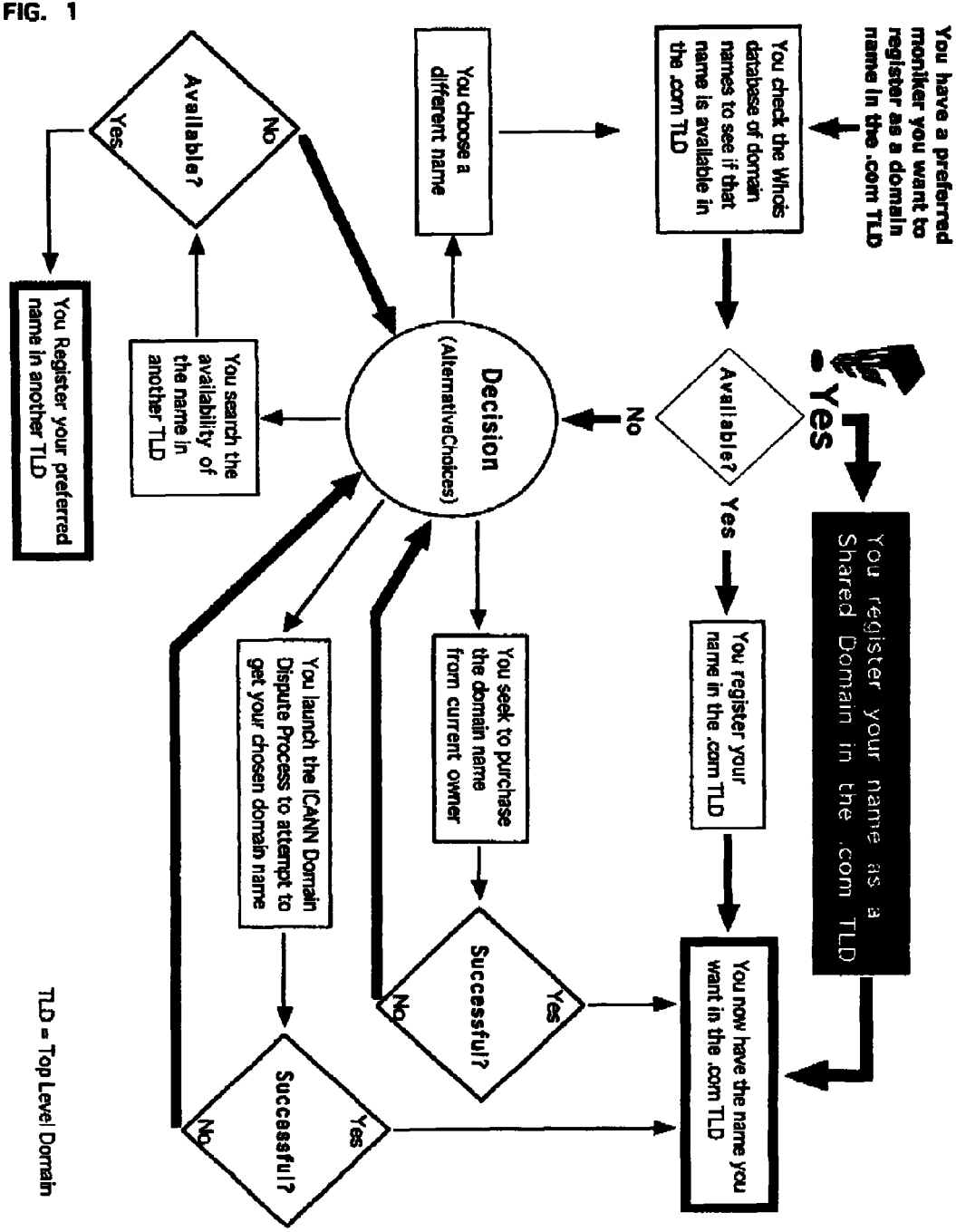
FIG. 1 is a flow chart illustrating a typical decision path in attempting to register a desired domain name, and illustrating a domain sharing alternative according to an embodiment of the present invention.

FIG. 1 illustrates how, in the current system, the path to aquiring a domain name can be difficult. Often, the desired domain name cannot be aquired and available compromises are unsuitable. As shown at the top of FIG. 1, the present invention solves this problem by enabling a new level of domain name availability and adding a new option for domain name registrations—domain name sharing. Currently, a conventional Whois web interface query for domain name availability generates one of two responses: either a statement that the domain name is available for registration (Yes) as shown in FIG. 1.1 or, the record of the current registrant (No) as shown in FIG. 1.2. The embodiment of the present invention allows a third response indicating an additional "Available" option (Yes—as a shared domain).

In one embodiment, a would-be registrant can register to share the desired domain name if it is registered to someone who is willing to share. In this embodiment the shared domain status is shown on the whois generated record. Typically, the shared status data is maintained by the registrant. For example, the registrant record retrieved when a whois query is sent, might indicate the status of the domain name as "shared registration" or "co-registration" or "co-delegation" or "co-use" or "co-location" or "multiple registrants" or other description indicating that the single domain name is shared by multiple parties. The record would typically indicate whether more co-users are, or are not, welcome. For example, an active link to Register Here to share this domain as shown in FIG. 1.3 is evidence that more shared registrations are welcome. In this embodiment, domain sharing is controlled by the original registrant and would typically be used by those engaged in Domain Sharing within the Gateway embodiment of the present invention shown in FIG. 2 and described in detail later herein. For purposes of the detailed description, the following apply equally for a person having a registration: registrant, owner or steward.

In another embodiment, domain sharing is a condition of registration with a particular registrar. Typically, the registrant record would indicate the shared domain status and include a registration link as shown in FIG. 1.4. The registrant record may show the original registrant or the registrar only and typically would link to the list of other registrants in that domain name. The registrant agreement with the registrar would include the specifics of the shared registration terms. This embodiment is ideally suited to a registrar who is also a web host provider and wishes to manage the Gateway web site and POP mail accounts as well as the Gateway mail server. As such, the registrar could offer services to help its customers share their domain names. For example, if a speculator has registered 1000 domain names and wishes to share them with others, he might select XYZ registrar as the registrar of record for all his domain names. He then contracts with the registrar to: manage the shared registrations, host the Gateway web site for each domain name and establish the e-mail accounts as outlined in FIGS. 2, 3, 4 and 5, and the further description herein. The original registrant benefits by contractually having multiple registrants for a single domain name, the registrar benefits by selling multiple registrations for the same name, and each sharing registrant benefits by having use of the desired domain name.

In yet a further embodiment, domain sharing can be a condition of registering domain names within a certain top level domain. Typically, a resource record (RR) called a Shared-Domain Registrant Record (SDRR) would be created and could be requested. Typically, a whois web interface query result would show that the domain name is available for registration as a shared domain and would provide a link to a listing of current registrants as shown in FIG. 1.5. Each current registrant listed would typically be linked to their individual SDRR.

In a further combination of the above embodiments, shared registration is not a condition of assignment and, the original registrant can further create a new SDRR at any time by using a RR creation interface provided by the registrar. A Whois interface query response would typically show either: this domain name is available for registration; this name is not available (and show the registrant record); or, this name is available for shared registration. As in the above described embodiment, a link would typically be provided to a list of other registrants and that list linked to individual SDRRs. The SDRR can be as the Registrant Record with a specified field containing the shared status. Or, the SDRR can be further defined to accommodate multiple SDRR records retrieved with a single query, as comprised in another embodiment described in detail later herein.

Figure 2:
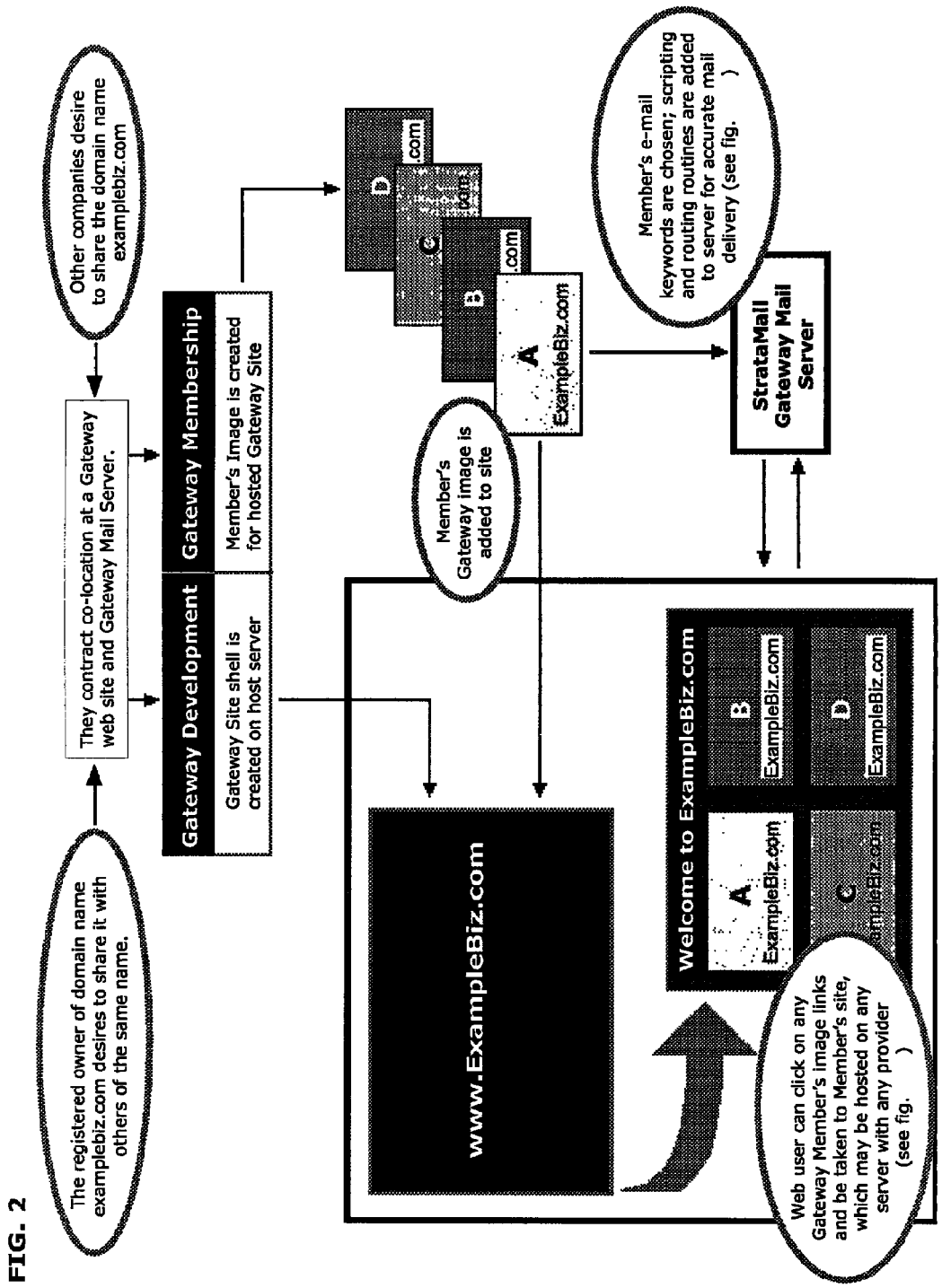
FIG. 2 is a schematic illustration of how a typical contract-based Shared Domain Gateway Membership having web site and e-mail presence is established according to an embodiment of the present invention.

As shown in FIG. 2, the gateway embodiment of the present invention suggests that the registrant of a domain name wants to share use of the domain name with others, presumably for profit. It also suggests that one or more additional parties want to share the domain name with the registrant and any others already co-located. However, in the future it is possible that mediation, arbitration, domain name policy or judicial ruling could require that parties share a domain name according to this or other embodiments of the present invention, whether they want to or not. Typically, those sharing the domain name in this embodiment would be called Gateway Members.

Typically, the business model for this embodiment would be contract based. It may include a rent or lease pricing model with fixed or negotiated fees for the services comprising this embodiment. However, for domain sharing to be a successful marketplace solution, the shared domain name must be a trusted unique identifier for each of the co-locators. It must function for both the world wide web (FIGS. 2,3,4) and e-mail (FIGS. 2,5). Merely placing several icons on a web page is not true domain name sharing, rather, it suggests a mini directory or, simply advertising. Similarly, many parties each having a POP mail account at a certain domain name is not true domain name sharing. Nor is it new, for it is the same model as corporate e-mail accounts for employees.

Typically, the gateway shell page would be created and hosted prior to, or at the time of the first domain sharing contract for that domain name. Upon agreement, the graphics and text necessary to create an image easily distinguishing the specific member are generated and located on the Gateway page as shown in FIG. 2.

As shown in FIG. 3, to be a true domain sharing solution, the sharing must be at the top level domain address without reduced designation. For example, if the parties wanting to share the domain name ExampleBiz.com are a real estate company, a travel agency, a widget manufacturer and a dance school, they must all be sharing the same page at the same top level domain address. The real estate company's distinguishing gateway image will not be located at www.examplebiz.com/realestate.html. Nor will the dance school's be at www.examplebiz.com/school/dance.html, and so on. Each will be located at www.examplebiz.com and each will be able to advertise or otherwise distribute the same domain name as their web site address.

Once at the gateway web site, a user finds it easy to distinguish one ExampleBiz from the others as shown in FIG. 3. The user selects which ExampleBiz site he wants to visit and clicks on the distinguishing link for that Member. Or, in the case of handicap enabled browsers, the name of the specific company may be spoken or, otherwise selected.

A Member's site can be located anywhere. However, as shown at the bottom of FIG. 3, typically the gateway URL follows through to the specific member's web site location bar by the use of hidden frames. The user may now bookmark the Member's web site preserving the shared domain name as the bookmark title while containing the actual URL.

Figure 4:
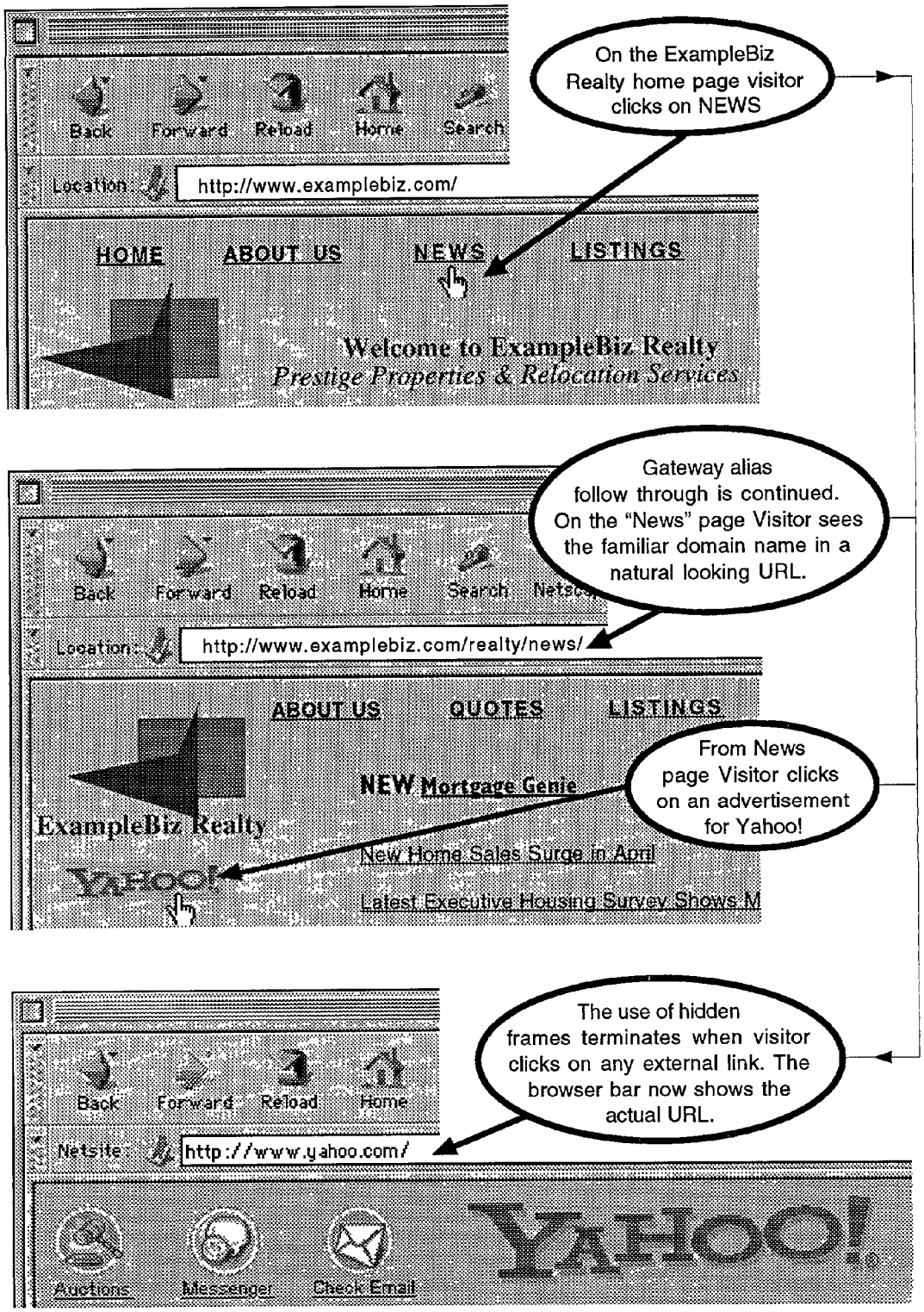
FIG. 4 is a schematic view of a typical graphical interface navigation path when the Shared Domain Name remains within hierarchically arranged page locations in the Member's web site according to an embodiment of the present invention.
Figure 5:
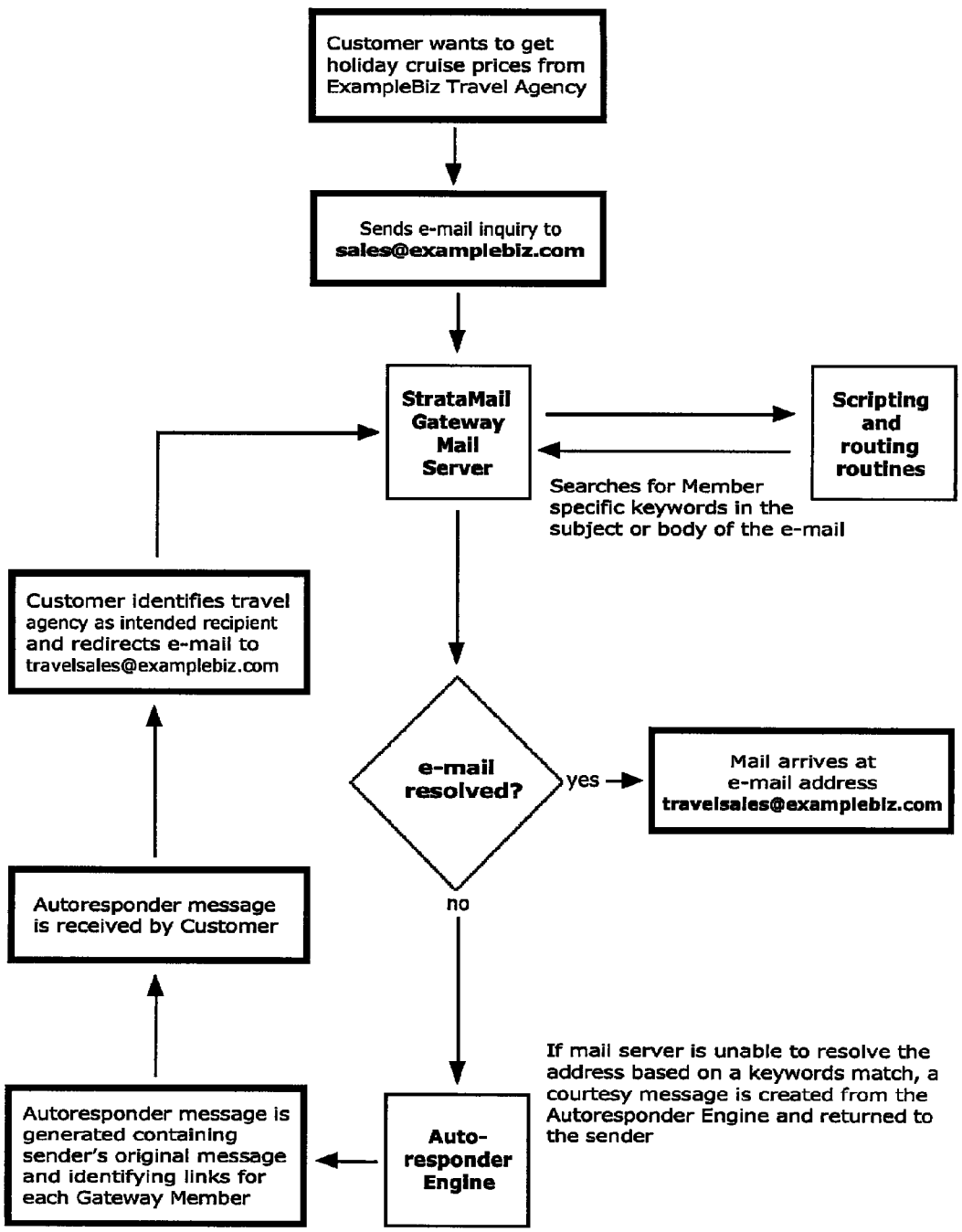
FIG. 5 is a flow chart illustrating how e-mail sent to a generic mailbox at a shared domain name is routed to the intended specific company according to an embodiment of the present invention.

As shown in FIG. 4, the Gateway embodiment allows that the Member's web site uses hidden frames in the location bar throughout all pages, in a hierarchical arrangement. If the user wishes to bookmark a certain page within the Member's site, again, the bookmark title is the name of the page and the bookmark contains the actual URL of that page. A user returning to the specific Member's web site can simply select the bookmark for www.examplebiz.com and he will bypass the Gateway page, going directly to the Member's page. Similarly, if he bookmarks an internal page of the Member's site and later selects that bookmark, he will go directly to that page, not the Member's home page and, not the Gateway page. If, however, the user has visited other Members of the same Gateway page and book marked their web site home page or other internal pages, he will have to manually distinguish in his bookmarks which is which. This is not new, as often web sites with altogether different addresses have pages titled the same. It is known that page names or page titles in bookmarks can be changed or otherwise arranged by the user.

As shown at the bottom of FIG. 4, the use of hidden frames terminates when the user clicks any link to a page outside of the Member's site. If, for example, the user clicks on an advertising icon or any external reference link, the selected page will show in the location bar without hidden frames.

As FIG. 5 illustrates, for there to be true domain name sharing there must be e-mail autonomy including the co-use of generic addresses such as info@examplebiz.com. All Gateway Members must be able to use the same generic e-mail addresses. This embodiment of the present invention allows multiple parties to say to their customers, for example, "If you have any problems let us know. Send e-mail to <problems@examplebiz.com>". To accomplish successful delivery of generically addressed e-mail to the intended recipients, a database is created within the Gateway Mail Server containing selected keywords intended to identify the Gateway Members, much like distinguishing features.

For example, the types of problems that one Member company expects to hear about will generally be different from those of another Member company. From these known distinctions, a list of keywords is created which, if present in the subject or the body of the e-mail message, can clearly indicate which Member company the mail is intended for. For example, one of the keywords selected by ExampleBiz Dance School may be "class" for, it is unlikely that the other Gateway Members in the above example would expect to get e-mail about problems which mail contains the word "class". Many levels of scripting and routing routines comprise the e-mail keyword check such that, keywords are looked for in specified order and the presence or absence of one keyword may activate checks for further distinguishing keywords.

As shown in FIG. 5, if the correct recipient identity cannot be assured through the use of keywords alone, then the e-mail message is returned to the sender to select the intended recipient. This message contains the sender's original message and links to all of the possible recipients, being the Gateway members for that domain name. The user is requested to identify the intended recipient and resend the message. This time the message goes to a further defined e-mail address. For example, if the original message was intended for the travel agency and sent to sales@examplebiz.com, the resend would go to travelsales@examplebiz.com.

Figure 6:
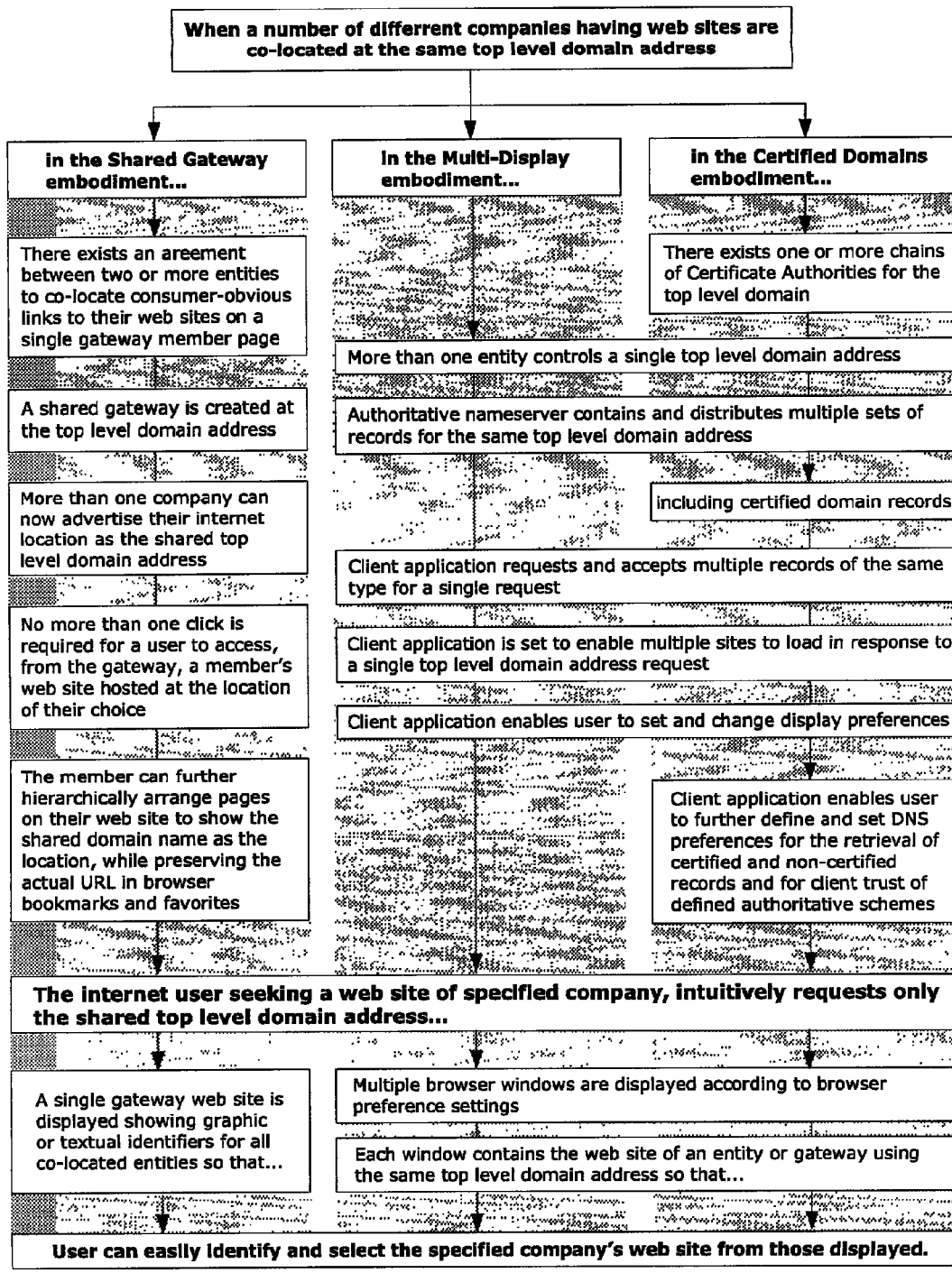
FIG. 6 is a schematic chart illustrating methods and benefits of domain name sharing according to three embodiments of the present invention.

FIG. 6 illustrates that the Shared Gateway is an embodiment of domain sharing for easy web site access. Further, it illustrates that the display of multiple browser windows resulting from a single user request is another embodiment of domain sharing for easy web site access. Further, it shows that sharing certified domain names is another embodiment of domain sharing for easy identification of shared status legitimacy.

Figure 7:
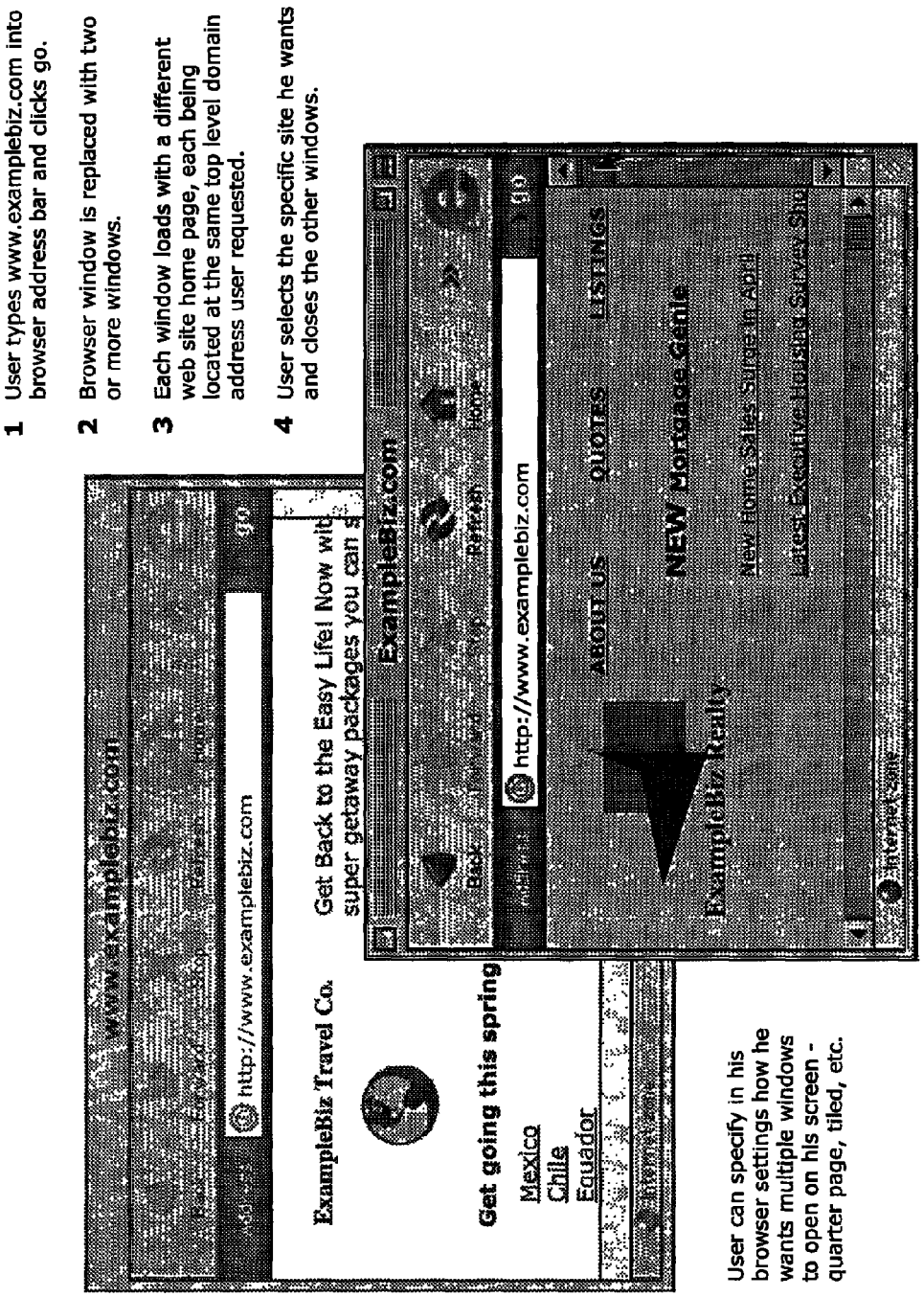
FIG. 7 is an illustration of two browser windows containing two different web sites in which the location address bar on each contains an identical top level domain address URL requested according to an embodiment of the present invention.
Figure 9:
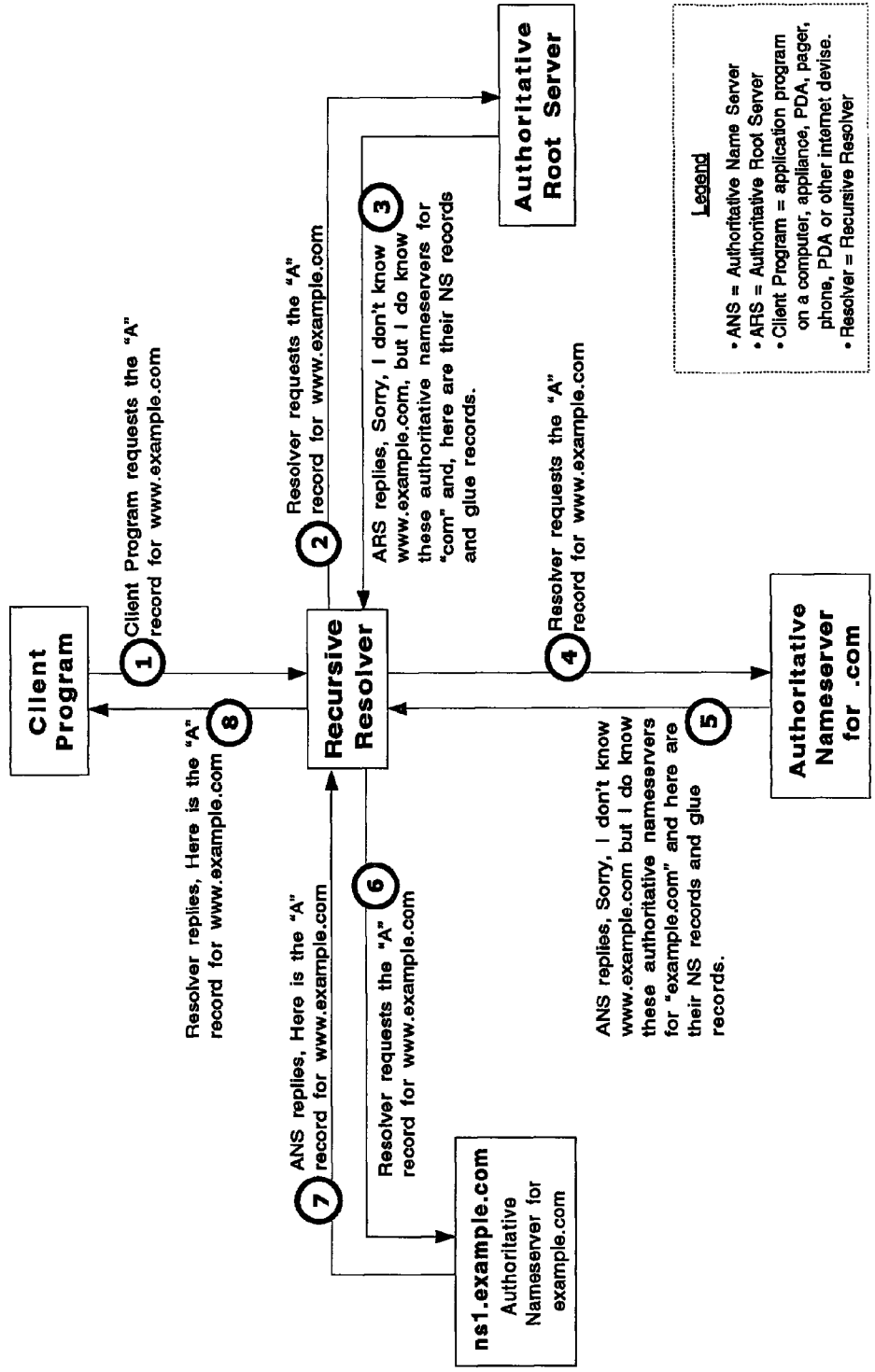
FIG. 9 is a flow chart illustrating how a recursive resolver server typically resolves a query from a client application for access to a top level domain address without the present invention.

FIG. 7 shows an alternative to users accessing the Shared Gateway, that of displaying more than one browser window, each containing a web site, each belonging to a separate co-locator. In this Multi-Display embodiment domain sharing is further taken to the DNS level of address records. The client is enabled, whether by plug-in or browser upgrade, to request "air" of a type of record for a specific URL. For example, as shown in FIG. 9, the client would now typically request "the" Address record for www.examplebiz.com. This further embodiment of domain name sharing allows that the client can request "all Address records" for www.examplebiz.com as shown in FIGS. 10.4 and 10.5. The creation of multiple records was discussed earlier herein and illustrated in FIG. 1.5. As shown in FIG. 7, the browser then loads a separate window containing all the web site URLs returned for the single query.

Figure 8:
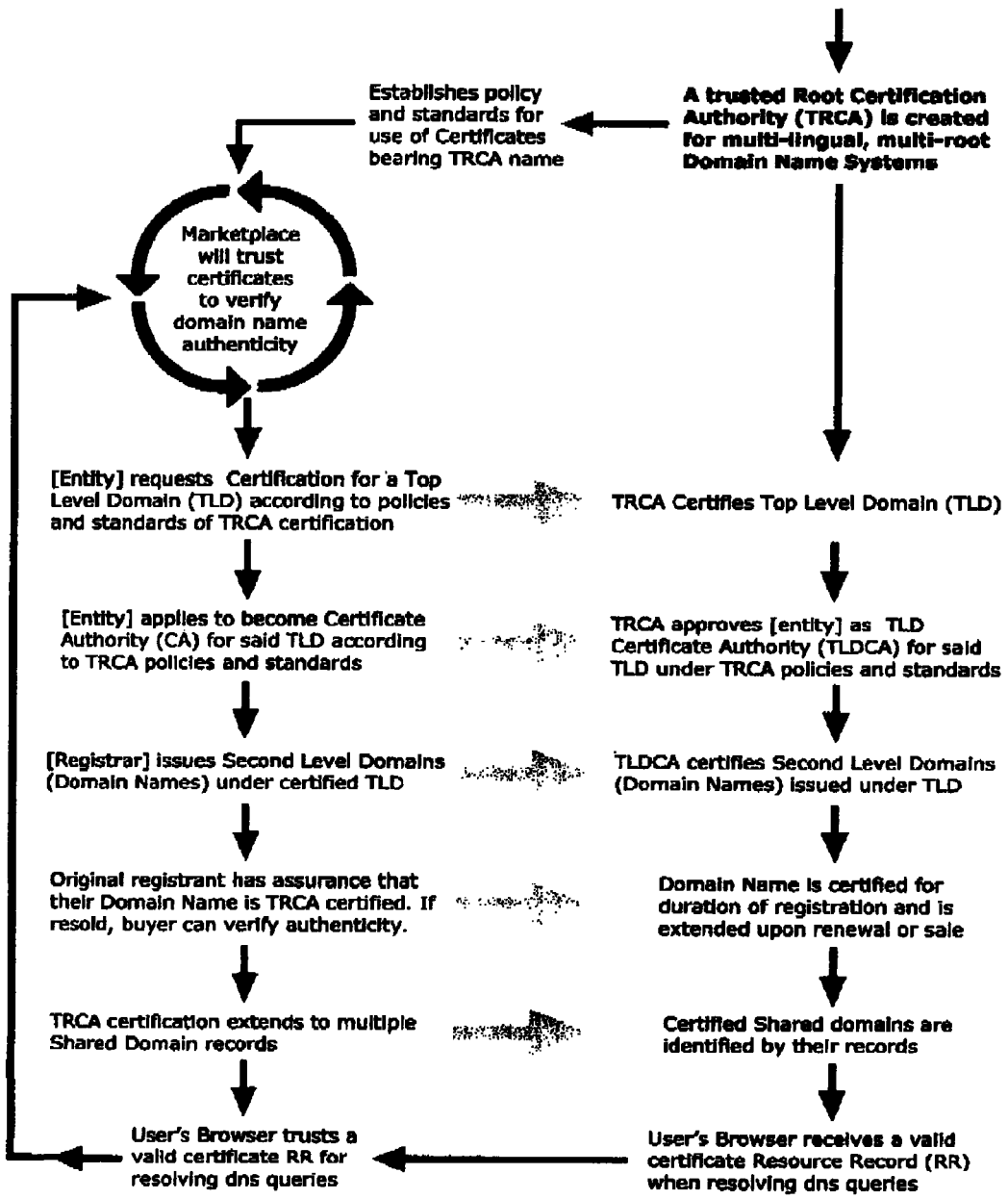
FIG. 8 is a flow chart illustrating a domain name certification scheme to verify stewardship of domain names including shared top level domain addresses according to an embodiment of the present invention.

As shown in FIG. 6 and in more detail in FIG. 8, a further embodiment of the present invention is the use of domain name certification. Verification of domain name authenticity when multiple records can be generated creates a needed trust scheme for DNS record management and one which the user can further define in the client application according to his preferences. This enables domain name sharing at all levels of name delegation. The user's typical experience at this level of domain name sharing is that he can select what roots he wants access to or what root servers he wants queried in what order within the browser interface. Further, he can choose how many web sites he wants to see for any single query. Further he can select criteria for which sites will display if his maximum number is less than those available and, how the windows will display on the screen. Further he can choose what level of veracity he requires to trust that any domain name is certified. And, he can choose whether to require certification for queries returned.

FIGS. 10.1 through 10.5 illustrate various scenarios in which the user seeks to access the web site www.example.biz. according to embodiments of the present invention. These include whether or not the browser preferences are set to request or require proof of domain name certification (a certificate resource record) and whether or not the domain name is actually certified. Additionally, FIG. 10.4 and FIG. 10.5 show requests for "all" records of the same type for the same URL, as described earlier herein.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be considered as being embraced within the spirit and scope of the claims.

What is claimed is:

1. A method for Internet name sharing within a name space of a name system, wherein:

the name space is structured hierarchically to organize a plurality of Internet names;

the name system operates in a distributed network;

the name system comprises a means of translating each of said plurality of Internet names into a plurality of underlying network identifiers;

each of said Internet name maps to an unique network identifier;

the name system comprises a means for using protocols to communicate identifying characteristics about each of said Internet names using a network record of a defined record type; said identifying characteristics being recorded on said record; said record belonging to a collection of records; said collection residing in a computer storage media configured to said hierarchical organization; said media residing in a storage device connected to said distributed network; said record being retrievable by a client application;

the name system permits an assignment of said Internet names by a registration;

the registration being assigned by a registry;

the registration being assigned through a registrar;

the registration being assigned to a registrant;

said method comprising:

authorizing a plurality of distinct registrations for a desired Internet name selected from said plurality of Internet names;

assigning a status descriptor to said desired Internet name; said status descriptor identifying said desired Internet name as a shared Internet name available for a shared registration;

transacting a first registration of said desired Internet name; wherein the transacting step further comprises steps of:

accessing a computer registration interface of the registrar connected to the registry;

verifying the desired Internet name is available for said shared registration;
submitting a first profile for a first registrant; said first profile comprising person contact information for said first registrant;
generating at least one of a first registrant record; said at least one first registrant record associating the first registrant with the first registration of the desired Internet name; said at least one first registrant record associating the first registrant with a first effective period for the first registration; said first effective period extending from a first registration created date to a first registration expiry date;
obtaining confirmation that said first registration of the desired Internet name is successful;
adding said at least one first registrant record to at least one of said record collections in at least one of said computer storage media;
generating a first network record for the desired Internet name; said first network record associated with the first registration of the desired Internet name;
adding at least one of said first network records associated with the first registration to at least one of a network record collection; said network record collection residing in at least one of a computer encoded with a program directed to network resolution; said computer connected to said distributed network;
transacting a second registration of said desired Internet name; said second registration being hierarchically identical to the first registration; said second registration having a second effective period; said second effective period overlapping a portion of said first effective period of; wherein the transacting step further comprises steps of:
accessing a computer registration interface of the registrar connected to the registry;
verifying the desired Internet name is available for said shared registration;
submitting a second profile for a second registrant; said second profile comprising person contact information for said second registrant;
generating at least one of a second registrant record; said at least one second registrant record associating the second registrant with the second registration of the desired Internet name; said at least one second registrant record associating the second registrant with a second effective period for the second registration; said second effective period extending from a second registration created date to a second registration expiry date;
obtaining confirmation that said second registration of the desired Internet name is successful;
adding said at least one second registrant record to at least one of said record collections in at least one of said computer storage media;
generating a second network record for the desired Internet name; said second network record associated with the second registration of the desired Internet name;
adding at least one of said second network records associated with the second registration to said at least one network record collection;
accessing a Whois client application to query for current registrants of the desired Internet name;
retrieving a plurality of current registrant records contained in at least one of said computer storage media; said plurality of current registrant records being retrievable by a single query; said plurality of current registrant records comprising: the first registrant record; the second registrant record;
resolving an Internet address query for said shared Internet name; wherein the resolving step further comprises steps of:
accessing a client resolver application in a computer connected to said distributed network;
querying for one of an address locator information for the shared Internet name;
receiving at least one of a reply; said at least one reply comprising said address locator information contained in at least one network record belonging to the shared Internet name;
directing a browser application to utilize said address locator information to access a plurality of web sites; said access requiring only a single user request; said plurality of web sites corresponding to sold a plurality of registrations of the shared Internet name; said plurality of registrations comprising; the first registration; the second registration;
such that:
a plurality of hierarchically identical registrations of a desired Internet name can exist in the name space without collision.

2. The method according to claim 1, wherein said unique network identifier is a DNS Internet protocol (IP) address.

3. The method according to claim 1, wherein said desired Internet name is a domain name; said domain name being a plurality of hierarchically arranged name labels, said labels being separated by a dot; said domain name comprising a top-level domain label and a second level domain label.

4. The method according to claim 1, wherein said desired Internet name is comprised of characters from a character type group comprising: number digits, letters, symbols, hyphens, diacritical marks, Punctuation marks.

5. The method according to claim 1, wherein said authorizing comprises a designation by a stakeholder of the desired Internet name.

6. The method according to claim 1, further comprising executing a transaction agreement; said agreement being between at least two parties; each of said parties being an entity from a group comprising: the registry, the registrar, the first registrant, the second registrant; said agreement specifying terms and conditions of said Internet name sharing; said terms and conditions comprising:
a duration of agreement;
a maximum number of entities allowed to share a single Internet name.

7. The method according to claim 1, further comprising utilizing a lookup service to request and retrieve at least one of a registrant contact person record for said desired Internet name; said lookup service utilizing at least one of an Internet standards protocol for registration record query and retrieval; said request being sent to at least one of a data repository within at least one of a network in a system; said system optionally having a client-server architecture; said system optionally having a query distribution architecture.

8. The method according to claim 7, further comprising said lookup service is a Whois client application.

9. The method according to claim 1, further comprising a user accesses a plurality of the record collections contained in a plurality of the storage devices in the network in order to retrieve a complete set of said, network records for said desired Internet name; said complete set of network records comprising: first registration records, second registration records.

10. The method according to claim 7, wherein said lookup tool is a component of a composite program.

11. The method according to claim 1, further comprising the step of adding said status descriptor to said first registrant record.

12. The method according to claim 1, further comprising steps of:
- accessing a computer medium comprising logic configured to generate registration records;
- adding a new registration status repository;
- generating at least one of a descriptor to indicate registration status;
- adding said at least one descriptors to said registration status repository.

13. The method according to claim 1, further comprising the steps of:
- accessing a computer medium comprising logic configured to generate registration records;
- adding an additional of a contact person repository to at least one of said first registrant records;
- populating said at least one contact person repository with at least one of a second contact person identifier associated with said second registration;
- accessing said lookup service to request a contact person record for said desired Internet name;
- retrieving a plurality of registrant contact identifiers for said desired Internet name; said plurality comprising: the first registrant, the second registrant.

14. The method according to claim 1, further comprising steps of:
- accessing a computer medium comprising a program directed to network resolution;
- configuring said program to allow a plurality of identical type network records for the desired Internet name to co-exist in the network; said plurality of identical type network records being associated with a plurality of registrations of the desired Internet name; said plurality of registrations comprising: the first registration, the second registration;
- configuring said program to allow a resolution of a single query by a retrieval of said plurality of identical type network records.

15. The method according to claim 1, further comprising a single request for records associated with the desired Internet name returns at least one record associated with each of the registrants of said desired Internet name.

16. The method according to claim 1, wherein a browser interface is used to generate said first and second registrant records.

17. The method according to claim 1, further comprising steps of modifying a single registration of said desired Internet name to create a shared registration; said steps comprising:
- accessing a first registrant account at a registrar;
- accessing said first registrant record of said desired Internet name;
- adding said shared Internet name status descriptor;
- adding a second registrant identifier to said registrant record.

18. The method according to claim 1, further comprising steps of creating a new shared registration of said desired Internet name, said steps comprising:
- verifying said desired Internet name is available for said shared registration;
- accessing a user interface of a program comprising logic configured to register Internet names;
- initiating a new registration of sold desired Internet name;
- adding said shared registration status descriptor;
- adding a second registrant identifier.

19. The method according to claim 1, further comprising said first registrant of said desired Internet name shares a single electronic mailbox address with said second registrant of said desired Internet name; wherein:
- said electronic mailbox address is hosted by a mail server;
- said mail server comprises a search engine;
- an electronic mail message sent to the electronic mailbox address comprises at least one of a keyword;
- said at least one keyword is identified with at least one of said registrants;
- said search engine matches one or more identified keywords in the electronic mail message against a set of keywords provided by at least one of said first and second registrants;
- said server sends electronic mail message to an intended recipient at a designated mailbox;

such that electronic mail messages intended for a specific registrant entity and sent to a shared recipient mailbox at the desired Internet name, is received autonomously by the intended recipient with ease.

20. The method according to claim 19, wherein said at least one keyword is located in a subject field of the electronic mail message.

21. The method according to claim 19, wherein said at least one keyword is located in a body field of the electronic mail message.

22. The method according to claim 1, wherein said record collection comprises at least one of a DNS resource record set; said set comprising at least one of a resource record.

23. The method according to claim 22, further comprising a step of modifying a type classification of at least one of a DNS record type.

24. The method according to claim 23, comprising a step of adding a selection mechanism for distinguishing between a plurality of identical type resource records belonging to said desired Internet name.

25. The method according to claim 22, further comprising a step of creating at least one of a new resource record type; each of said at least one new record type having a type name.

26. The method according to claim 25, further comprising said new resource record type is assigned a type number; said number being an identifier code used to identify said record type in said name system; said number being assigned by an Internet authority.

27. The method according to claim 25, wherein said resource record type is identified in the name system as a resource record (RR) of unknown type.

28. The method according to claim 24, further comprising extending DNS functionality to allow mapping said desired Internet name to a plurality of Internet sites; said mapping utilizing an Internet protocol addressing scheme comprising steps of:
- creating a first resource record set for said first registration;
- creating a second resource record set for said second registration;
- adding at least one of an identifier to a first specified record type belonging to said first registration resource record set;
- adding at least one of an identifier to a second specified record type belonging to said second registration resource record set;
- said first and second specified records having said selection mechanism for distinguishing between a plurality of identical type resource records belonging to said desired Internet name.

29. The method according to claim 28, further comprising a user request for access to an Internet site of said desired Internet name accesses said plurality of Internet sites associated with said desired Internet name;
- each of said plurality of Internet sites being an unique Internet site;
- each of said unique Internet site opening in a separate viewing area of a browser;
- each of said unique Internet sites belonging to a unique registrant of said desired Internet name;
- each unique Internet site being live;
- such that a user can select and access an Internet site belonging to a specific registrant of the desired Internet name without having to request more than one address of said desired Internet name.

30. The method according to claim 28, further comprising a step of setting at least one of a browser preferences for management of said plurality of Internet sites in said browser display.

31. The method according to claim 28, further comprising a step of setting at least one of a DNS query preference for management of access requests for said desired Internet name addresses.

32. The method according to claim 28, further comprising a step of setting at least one of an authoritative server query preferences for management of access requests for said, desired Internet name addresses.

33. The method according to claim 22, further comprising steps of certifying at least one of said DNS resource records for said desired Internet name; said steps comprising:
- certifying a top level domain as a certificate authority by a trusted root certificate authority;
- certifying at least one of a shared second level domain name under said top level domain by said certificate authority;
- creating at least one of a retrievable DNS record set for each shared second level domain name; said retrievable DNS record set having a verification data;
- hosting at least one of a retrievable record of said retrievable DNS record set on at least one of an authoritative nameserver; wherein said authoritative nameserver is known to an authoritative root server; wherein said authoritative root server operates within a DNS root network;
- such that a user can access and easily identify a certified shared top level domain address.

* * * * *